(12) United States Patent
Lin et al.

(10) Patent No.: US 11,846,739 B2
(45) Date of Patent: Dec. 19, 2023

(54) CIRCUIT FOR SENSING X-RAY

(71) Applicant: InnoCare Optoelectronics Corporation, Tainan (TW)

(72) Inventors: Hsin-Hung Lin, Tainan (TW); Chin-Chi Chen, Tainan (TW); Chih-Hao Wu, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 171 days.

(21) Appl. No.: 17/147,427

(22) Filed: Jan. 12, 2021

(65) Prior Publication Data

US 2022/0221598 A1 Jul. 14, 2022

(51) Int. Cl.
*G01T 1/24* (2006.01)
*G01T 1/17* (2006.01)

(52) U.S. Cl.
CPC .............. *G01T 1/247* (2013.01); *G01T 1/17* (2013.01); *G01T 1/241* (2013.01)

(58) Field of Classification Search
CPC ............ G01T 1/17; G01T 1/241; G01T 1/247
See application file for complete search history.

(56) References Cited

U.S. PATENT DOCUMENTS

| | | | | |
|---|---|---|---|---|
| 5,276,329 A * | 1/1994 | Hughes | ................ | G01T 1/2018 250/370.11 |
| 5,313,066 A * | 5/1994 | Lee | .................. | G01T 1/246 250/580 |
| 6,323,490 B1 * | 11/2001 | Ikeda | .................. | H04N 5/3658 250/370.07 |
| 2003/0189175 A1 * | 10/2003 | Lee | .................. | H01L 27/14658 257/E27.14 |
| 2004/0119855 A1 * | 6/2004 | Partain | .................. | H04N 5/32 348/222.1 |
| 2004/0174959 A1 * | 9/2004 | Green | .................. | H01J 35/06 378/146 |
| 2005/0109927 A1 * | 5/2005 | Takenaka | .............. | G01T 1/2928 250/252.1 |
| 2007/0211858 A1 * | 9/2007 | Franklin | ........... | H01L 27/14676 378/97 |
| 2008/0023638 A1 * | 1/2008 | Starman | .................. | G01T 1/247 250/371 |
| 2009/0321643 A1 * | 12/2009 | Rutten | .............. | H01L 27/14658 250/371 |
| 2014/0034950 A1 * | 2/2014 | Li | ........................ | H01L 27/1255 257/53 |
| 2014/0037056 A1 * | 2/2014 | Naito | ..................... | G01N 23/04 378/62 |
| 2014/0226795 A1 * | 8/2014 | Kitano | ..................... | A61B 6/56 378/189 |
| 2016/0117584 A1 * | 4/2016 | Yoneda | ............ | G06K 19/07707 235/492 |
| 2016/0227140 A1 * | 8/2016 | Colbeth | ............... | H04N 25/778 |
| 2018/0143331 A1 * | 5/2018 | Maeda | ....................... | G01T 1/24 |
| 2021/0150241 A1 * | 5/2021 | Fukutome | ............ | G06N 3/0454 |

FOREIGN PATENT DOCUMENTS

CN 101490580 7/2012

* cited by examiner

*Primary Examiner* — Blake C Riddick
(74) *Attorney, Agent, or Firm* — JCIPRNET

(57) ABSTRACT

A circuit for sensing an X-ray including a switching element, a storage element, a sensing element and a branching element. The storage element electrically coupled to the switching element. The sensing element electrically coupled to the switching element. The branching element electrically coupled between the storage element and the sensing element.

15 Claims, 5 Drawing Sheets

CIRCUIT FOR SENSING X-RAY

BACKGROUND

Technical Field

The present disclosure relates to a circuit for sensing an electromagnetic ray, and particularly relates to a circuit for sensing an X-ray.

Description of Related Art

With the rapid development of electronic products, sensors are employed in a variety of electronic devices or systems. Sensors such as photodetectors sensitive to visible lights or other electromagnetic rays (for example, a gamma ray, an X-ray, an ultraviolet light, an infrared light, etc.) are particularly useful for image capturing in radiation medicine, animal experiments, industrial non-destructive testing, etc. The photodetector imaging devices are constantly improved for their image quality and reliability.

SUMMARY

The present disclosure provides a circuit for sensing an X-ray with improved quality or reliability.

According to an embodiment of the present disclosure, a circuit for sensing an X-ray includes a switching element, a storage element, a sensing element, and a branching element. The storage element electrically coupled to the switching element. The sensing element electrically coupled to the switching element. The branching element electrically coupled between the storage element and the sensing element.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
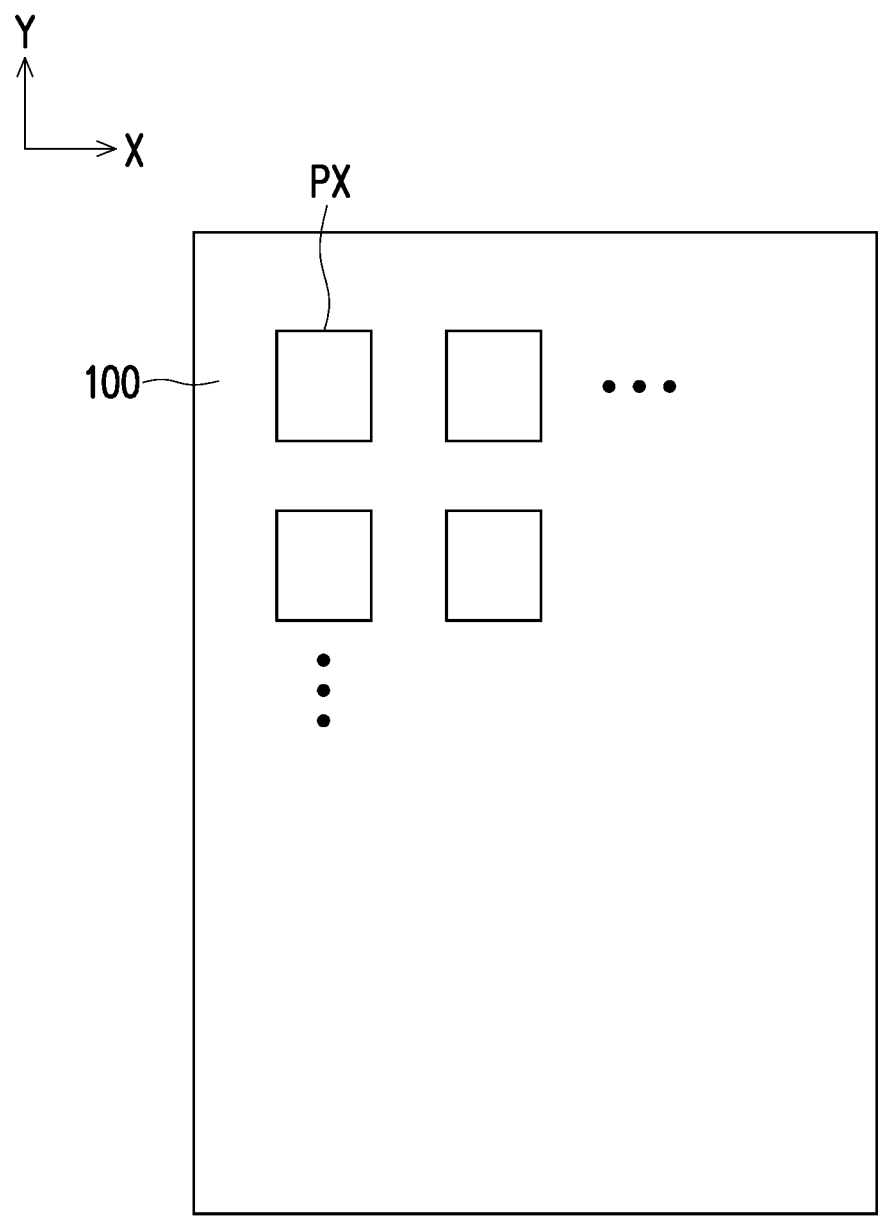
FIG. 1 is a schematic top view of an X-ray device in an embodiment of the present disclosure.

Some words are used to refer to specific components in the whole specification and the appended claims in the present disclosure. A person skilled in the art should understand that an electronic device manufacturer may use different names to refer to the same components. This specification is not intended to distinguish components that have the same functions but different names. In this specification and the claims, words such as "include", "comprise", and "have" are open words, and should be interpreted as "including, but not limited to". Therefore, when terms "include", "comprise", and/or "have" are used in the description of the present disclosure, the presence of corresponding features, regions, steps, operations and/or components is specified without excluding the presence of one or more other features, regions, steps, operations and/or components.

The directional terms mentioned herein, such as "above", "below", "front", "back", "left", and "right", refer to the directions in the accompanying drawings. Therefore, the directional terms are only used for illustration instead of limiting the present disclosure. In the accompanying drawings, common features of a method, a structure and/or a material used in a specific embodiment are shown in the drawings. However, these drawings should not be construed as defining or limiting the scope or nature of these embodiments. For example, the relative sizes, thicknesses and positions of films, regions and/or structures may be reduced or enlarged for clarity.

It should be understood that, when a component or a film is referred to as being "connected to" another component or film, it may be directly connected to another component or film, or there are components or films inserted between the two components or films. When a component or a film is referred to as being "directly connected to" another component or film, there is no component or film inserted between the two components or films. In addition, when a component is referred to as being "coupled to another component (or a variant thereof)", it may be directly connected to another component, or may be indirectly connected to (for example, electrically connected to) the another component through one or more components.

The term "approximately", "equal to", "the same as", "substantially" or "roughly" is generally interpreted as being within 20% of a given value or range, or interpreted as being within 10%, 5%, 3%, 2%, 1% or 0.5% of a given value or range.

A structure (or layer, component, substrate) being located on another structure (or layer, component, substrate) described in the present disclosure may mean that two structures are adjacent and directly connected, or may mean that two structures are adjacent and indirectly connected. Indirect connection means that there is at least one intermediate structure (or intermediate layer, intermediate component, intermediate substrate, intermediate spacing) between two structures, the lower surface of a structure is adjacent or directly connected to the upper surface of the intermediate structure, and the upper surface of the other structure is adjacent or directly connected to the lower surface of the intermediate structure. The intermediate structure may be a single-layer or multi-layer physical structure or non-physical structure, which is not limited. In the present disclosure, when a structure is on or disposed "on" another structure, it may mean that a structure is "directly" disposed on another structure, or a structure is "indirectly" disposed on another structure, that is, at least one structure is sandwiched between a structure and another structure.

The terms such as "first", "second", and the like in this specification may be used for describing various elements, components, areas, layers, and/or parts, but the elements, components, areas, layers, and/or parts are not limited by such terms. The terms are only used to distinguish one element, component, area, layer, or part from another element, component, area, layer, or part. Therefore, a "first component", "first element", "first region", "first layer", or "first part" discussed below is used to distinguish it from a "second component", "second element", "second region", "second layer", or "second part", and is not used to define an order or a specific component, element, region, layer and/or part.

In the present disclosure, various embodiments described below may be used in any combination without departing from the spirit and scope of the present disclosure, for example, some features of one embodiment may be combined with some features of another embodiment to form another embodiment.

Exemplary embodiments of the present disclosure are described in detail, and examples of the exemplary embodiments are shown in the accompanying drawings. Whenever possible, the same component symbols are used in the drawings and descriptions to indicate the same or similar parts.

Figure 2:
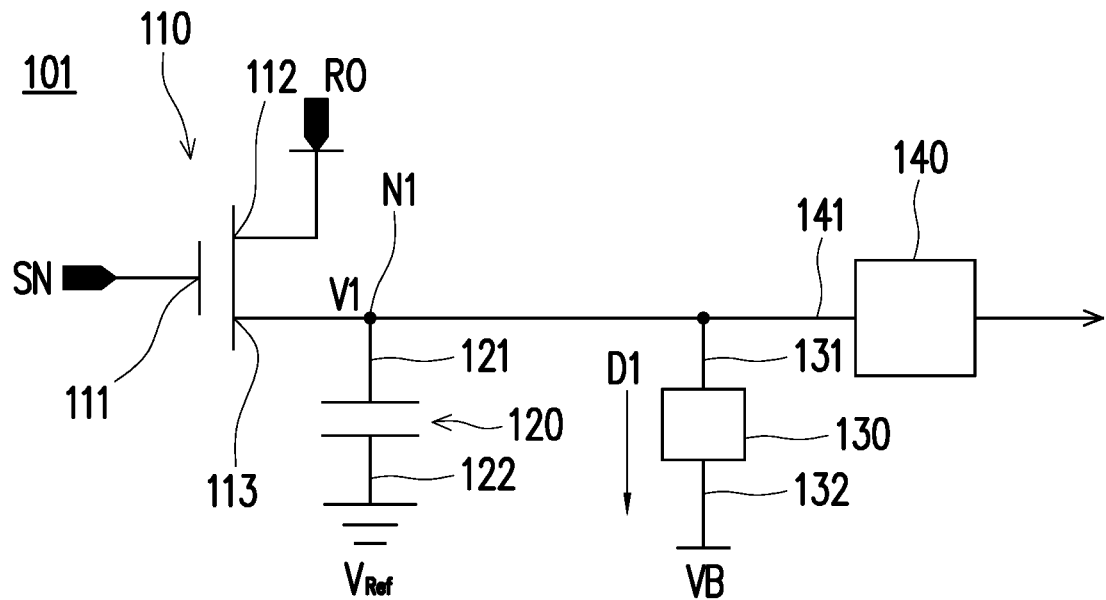
FIG. 2 is a circuit diagram of a circuit for sensing X-ray in a pixel structure of the X-ray device of FIG. 1.

FIG. 1 is a schematic top view of an X-ray device in an embodiment of the present disclosure. FIG. 2 is a circuit diagram of a circuit for sensing an X-ray in a pixel structure of the X-ray device of FIG. 1. Referring to FIG. 1 and FIG. 2, the X-ray device 10 according to an embodiment may include a plurality of pixel structures PX. The pixel structures PX may be arranged into an array disposed on a substrate 100. Each of the pixel structures PX may include a circuit 101 for sensing an X-ray. The circuit 101 may include a switching element 110, a storage element 120, a sensing element 140 and a branching element 130. In some embodiments, the storage element 120 is electrically coupled to the switching element 110. The sensing element 140 is electrically coupled to the switching element 110. According to an embodiment, the branching element 130 is electrically coupled between the storage element 120 and the sensing element 140. In other words, the switching element 110 is electrically coupled to the storage element 120, the branching element 130, and the sensing element 140. The switching element 110 has a first terminal 111 (may be referred to as a control terminal), a second terminal 112 and a third terminal 113. The storage element 120 has a first terminal 121. The first terminal 121 of the storage element 120 is electrically coupled to the third terminal 113 of the switching element 110, a first terminal 131 of the branching element 130, and a first terminal 141 of the sensing element 140. Under the above configurations, a first voltage V1 at the storage element 120 may be substantially the same as a bias voltage VB at the second terminal 132 of the branching element 130. Thus, the X-ray device 10 may have better image quality, or improved reliability.

According to an embodiment, the pixel structures PX are disposed on the substrate 100 along a first axis X (i.e. x-axis) and a second axis Y (i.e. y-axis) in a grid-like array, but not limited thereto. The substrate 100 may include, for example, a rigid substrate or a flexible substrate. For example, a material of the substrate 100 include glass, quartz, sapphire, ceramic, polycarbonate (PC), polyimide (PI), polyethylene terephthalate (PET), other suitable substrate materials, or a combination of the above, but is not limited thereto. In some embodiments, the substrate 100 includes a printed circuit board (PCB).

According to an embodiment, the X-ray device 10 further includes signal circuits (not shown) disposed on the substrate 100. For examples, the signal circuits include a scan line, a data line, a power line and other suitable circuits, but not limited thereto. In some embodiments, the scan lines and the data lines are disposed along the x-axis and y-axis, and interweaving into a grid, but the embodiment is not limited thereto. The material of the signal circuits may include molybdenum (Mo), titanium (Ti), aluminum (Al), tantalum (Ta), niobium (Nb), hafnium (HO, nickel (Ni), chromium (Cr), cobalt (Co), zirconium (Zr), tungsten (W), other suitable metals, or alloys or combinations of the above materials, but the embodiment is not limited thereto.

Referring to FIG. 2, each of the pixel structures PX includes the circuit 101. The circuit 101 may include the switching element 110 having a plurality of terminals. The switching element 110 may be a thin film transistor (TFT) or any other suitable active device. The switching element 110 includes the first terminal 111 (may also be referred as the control terminal), the second terminal 112 and the third terminal 113. In some embodiments, the first terminal 111 may be a gate electrode and may be electrically coupled to the scan line. That is to say, the first terminal 111 (e.g. the control terminal) is electrically coupled to a scan signal SN through the scan line. The second terminal 112 may be a source electrode and may be electrically coupled to the data line (not shown). According to some embodiments, the second terminal 112 may optionally couple to a circuit component (not shown). The circuit component may be a readout integrated circuit, but the embodiment is not limited thereto. That is to say, the second terminal 112 is electrically coupled to a readout signal RO. The third terminal 113 may be a drain electrode and may be electrically coupled to the storage element 120, the branching element 130, and the sensing element 140.

In some embodiments, the switching element 110 may include a semiconductor material, such as amorphous silicon, poly-silicon, low temperature poly-silicon (LTPS), or metal oxide, but not limited thereto. The switching element 110 may be a top gate, a bottom gate, or a dual gate TFT, but the embodiment is not limited thereto.

Referring to FIG. 2 again, the third terminal 113 of the switching element 110 is coupled to the storage element 120, the branching element 130 and the sensing element 140 at a node N1. Specifically, a first terminal 121 of the storage element 120 is electrically coupled to the third terminal 113 of the switching element 110 at the node N1. A second terminal 122 of the storage element 120 may be coupled to a reference signal $V_{Ref}$. The reference signal $V_{Ref}$ may be a ground signal, but not limited thereto. In the illustrated embodiment, the storage element 120 may include a capacitor, but not limited thereto.

In some embodiments, the first terminal 141 of the sensing element 140 is coupled to the first terminal 121 of the storage element 120 and the third terminal 113 of the switching element 110 at the node N1. The sensing element 140 includes a photoconductor or a photodiode. The sensing element 140 may be adapted to receive electromagnetic radiations such as X-ray radiation to generate charges. Specifically, the sensing element 140 may be provided with a voltage from a voltage supply (not shown), and when the sensing element receives an external X-ray, the sensing element 140 may generate an induced charge, an electrically current, or a signal. The signal provided or outputted by the sensing element 140 may have the first voltage V1 (may also be referred as a sensing voltage). The first voltage V1 may be detected at the node N1, but not limited thereto. In the illustrated embodiment, the sensing element 140 is a photoconductor capable of sensing the X-ray according to an electromagnetic induction effect. In some other embodiments, the sensing element 140 also includes a photoconductor used for sensing other visible lights or invisible lights, but not limited thereto.

In some embodiments, the sensing element 140 may include amorphous selenium (a-Se). In some other embodiments, the sensing element 140 may further include silicon, germanium, thallium bromide, or other suitable semiconductor materials, but not limited thereto.

It should be noted that a first terminal 131 of the branching element 130 is coupled to the third terminal 113 of the switching element 110, the first terminal 121 of the storage element 120, and the first terminal 141 of the sensing element 140 at the node N1. In some of the embodiments, the branching element 130 may include a switch component or a diode, or a combination thereof, but not limited thereto. In some embodiments, the branching element 130 may also include a plurality of interconnected diodes, but not limited thereto. In the illustrated embodiment, the branching element 130 is coupled between the storage element 120 and the sensing element 140, but the limited thereto. In some other embodiments, the branching element 130 is coupled between the switching element 110 and the storage element 120, or coupled between the switching element 110 and the sensing element 140. The second terminal 132 of the branching element 130 may be electrically coupled to a bias signal with the bias voltage VB. In some embodiments, the bias signal may be provided by a bias source. In some embodiments, the first terminal 131 of the branching element 130 may be an anode, and the second terminal 132 of the branching element 130 may be a cathode, but the disclosure is not limited thereto.

Under the above configurations, the branching element 130 (such as a diode) may be used to provide a first diverting current D1 so as to decrease the voltage level at node N1. Specifically, when the sensing element 140 receives the X-ray, the induced charges may be generated by the sensing element 140 and provides the first voltage V1 at the node N1. The first terminal 121 of the storage element 120 may serve as a charge collecting electrode (CCE) and collect or store the charges generated by the sensing element 140. The readout integrated circuit may be electrically coupled to the switching element 110 at the second terminal 112, and may then perform a readout function to read the stored charges (may be referred as the readout signal RO) provided by the storage element 120, or perform a reset function. Therefore, the X-ray device 10 may be used for X-ray imaging functions.

When the sensing elements 140 receiving a higher intensity X-ray radiation (e.g. where the pixel structures PX are not shielded by any object such as a human body), the generation of excessive charges may be generated at the node N1. That is to say, the first voltage V1 may contribute to the increase of a voltage of the storage element 120, and the voltage of the storage element 120 may be increased to be greater than the bias voltage VB. Prolong exposure to high voltage level may cause deterioration of the switching element 110 or may reduce the lifespan of the switching element 110.

It should be noted that, when the voltage of the storage element 120 at the node N1 is greater than the bias voltage VB from the bias signal, the first diverting current D1 may be formed across the branching element 130. Specifically, the first diverting current D1 may flow from the first terminal 131 of the branching element 130 to the second terminal 132 of the branching element 130, so that the voltage of the storage element 120 at the node N1 may be decreased. That is to say, the first voltage V1 (for example, a sensing voltage which is outputted from the sensing elements 140) is diverted by the branching element 130 when the voltage of the storage element 120 is greater than the bias voltage VB. Therefore, the voltage of the storage element 120 may be maintained at a substantially similar level as the bias voltage VB. Based on the above, when the switching element 110 is turned on (i.e. the switching element 110 is conductive), the risks of damaging the switching element 110 by a larger current flowing into the switching element 110 may be reduced. The larger current may be generated by a larger voltage difference. Based on the above, the high voltage level at node N1 caused by the excessive charges may be prevented. So that, the quality or the reliability of the X-ray device 10 may be improved.

Figure 3:
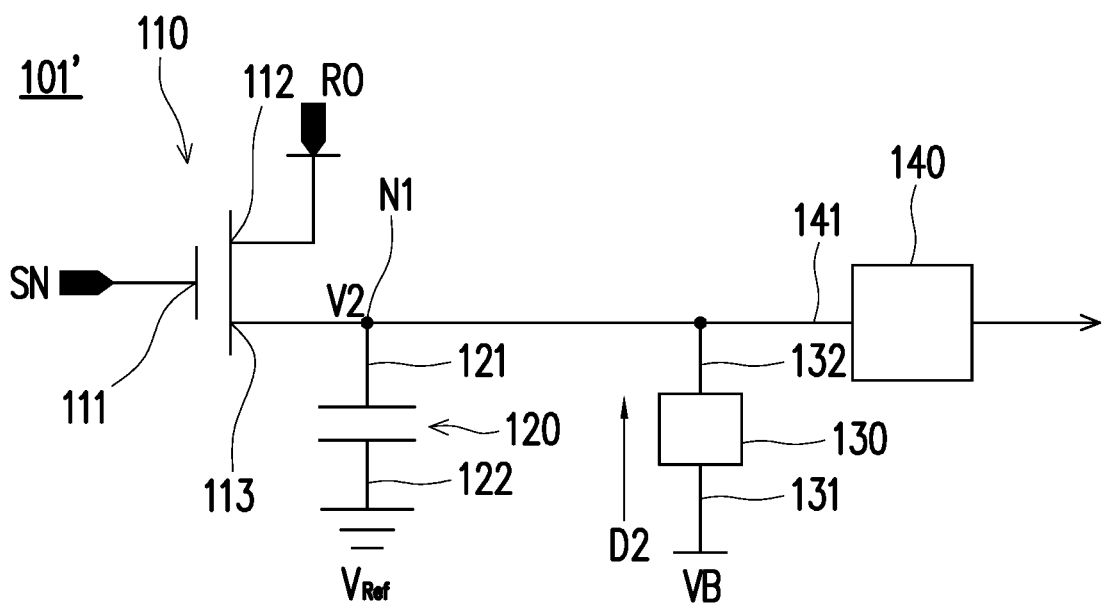
FIG. 3 is a circuit diagram of a circuit for sensing X-ray in a pixel structure in another embodiment of the present disclosure.

FIG. 3 is a circuit diagram of a circuit for sensing X-ray in a pixel structure in another embodiment of the present disclosure. The pixel structure PX' of the present embodiment is substantially similar to the pixel structure PX in FIG. 2, and thus the same or similar components in the two embodiments are omitted herein. The present embodiment is different from the pixel structure PX in that: in the circuit 101', the second terminal 132 is electrically coupled to the node N1, and the first terminal 131 is electrically coupled to the bias signal with the bias voltage VB. The first terminal 131 may be an anode, and the second terminal 132 may be a cathode.

Under the above configurations, the branching element 130 may be used to provide a second diverting current D2. Specifically, when the voltage of the storage element 120 at the node N1 is less than the bias voltage VB from the bias signal, the second diverting current D2 may be formed across the branching element 130. The second diverting current D2 may flow in a direction from the first terminal 131 to the second terminal 132. In other words, a portion of charges which generated by the sensing element 140 may flow through the first terminal 131 and the second terminal 132, thus increasing the second voltage V2 at the node N1. Therefore, the voltage of the storage element 120 may be increased or maintained at a substantially similar level as the bias voltage VB. Based on the above, the voltage values may be balanced, or kept at a desired value which is a safety value that the switching element 110 would not be damaged. For example, the safety value may be substantially the same as the bias voltage VB. The X-ray device 10 has improved quality or reliability.

Figure 4A:
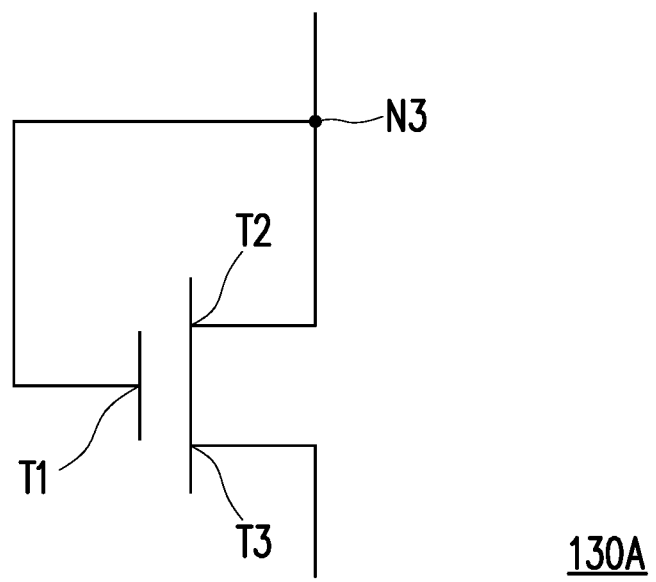
FIG. 4A is a circuit diagram of a structure of the branching element in another embodiment of the present disclosure.

FIG. 4A is a circuit diagram of a structure of the branching element in another embodiment of the present disclosure. The branching element 130A may be a switch component for example a thin-film transistor (TFT) including a plurality of terminals, such as a control terminal T1, a second terminal T2, and a third terminal T3. The control terminal T1 may be a gate electrode. The second terminal T2 may be a source electrode. The third terminal T3 may be a drain electrode. The control terminal T1 and the second terminal T2 is coupled at a node N3. The node N3 may be electrically coupled to the node N1 as shown in FIG. 2 or FIG. 3. In some embodiments, the node N3 coupled between the sensing element 140 and the storage element 120 as shown in FIG. 2 or FIG. 3. The third terminal T3 is electrically coupled to the bias signal as shown in FIG. 2 or FIG. 3 in a similar fashion as the second terminal 132. The control terminal T1 may be electrically coupled to the second terminal T2. Therefore, when the first voltage V1 is larger than bias voltage VB, the control terminal T1 may turn on the branching element 130A and form the first diverting current D1 or the second diverting current D2 (as shown in FIG. 2 or FIG. 3). The another portion of the charges as mentioned above may flow through the node N3 to the third terminal T3 of the branching element 130A. Based on the above, the high voltage level at node N1 (as shown in FIG. 2 or FIG. 3) caused by the excessive charges may be decreased. The X-ray device has improved the quality or the reliability.

Figure 4B:
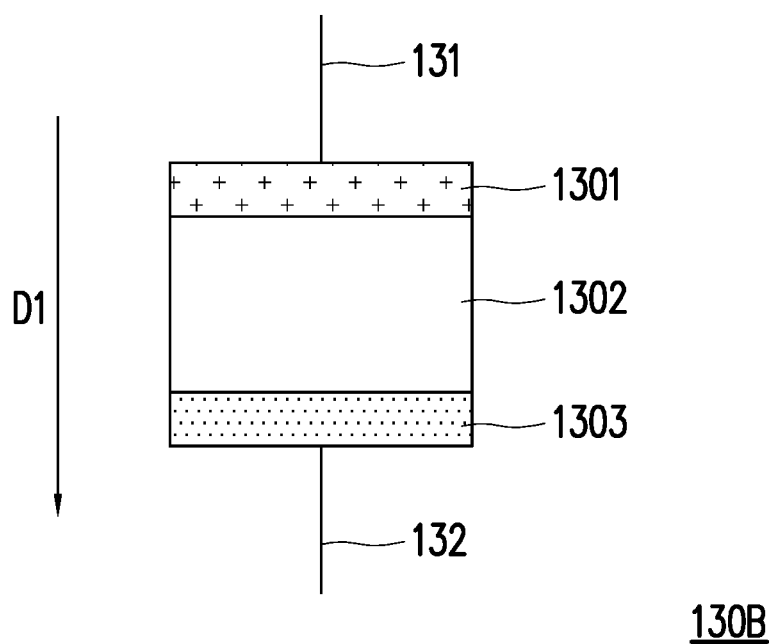
FIG. 4B is a schematic diagram of the branching element in another embodiment of the present disclosure.

FIG. 4B is a schematic diagram of the branching element in another embodiment of the present disclosure. In the illustrated embodiment, the branching element 130B may be a diode. The diode may be a PIN diode. For example, the branching element 130B may include a first doped layer 1301, an intrinsic layer 1302, and a second doped layer 1303 opposite to the first doped layer 1301. The intrinsic layer 1302 is between the first doped layer 1301 and the second doped layer 1303. In some embodiment, the intrinsic layer 1302 may include silicon, but not limited thereto. The first doped layer 1301 may include a p-type semiconductor. For example, the p-type semiconductor is an intrinsic semiconductor (such as silicon) doped with Group III elements such boron, aluminum, gallium, or indium. The second doped layer 1303 may include a n-type semiconductor. For example. the n-type semiconductor is an intrinsic semiconductor (such as silicon) doped with Group V elements such as phosphorus, arsenic, antimony, or bismuth. In some other embodiments, lithium may also be used as a dopant to form the n-type semiconductor.

In some embodiments, the first doped layer 1301 may be electrically coupled to the first terminal 131 of the branching element 130B, and the second doped layer 1303 may be electrically coupled to the second terminal 132 of the branching element 130B. For example. the first terminal 131 is the anode, and the second terminal 132 is the cathode. Under the above configuration, the first doped layer 1301 is electrically coupled to the first terminal 131 of the branching element 130B at the node N1 (shown in FIG. 2), and the second doped layer 1303 is electrically coupled to the second terminal 132 of the branching element 130B, which may be coupled to the bias signal with the bias voltage VB. When the voltage of the storage element 120 is larger than the bias voltage VB, electron-hole pairs are formed in the intrinsic layer 1302 thus reducing the electrical resistance in the intrinsic layer 1302. The first diverting current D1 is formed, thus a portion of the charges generated by the sensing element 140 may be diverted. In other word, the portion of the charges may flow through the first terminal 131, the first doped layer 1301, the intrinsic layer 1302, and the second doped layer 1303. Another portion of the charges generated by the sensing element 140 may be stored in the storage element 120. Therefore, the voltage of the storage element 120 may be decreased or maintained at a substantially similar level as the bias voltage VB. Based on the above, the voltage may be balanced, or kept at a desired voltage. The high voltage level at the node N1 (as shown in FIG. 2 or FIG. 3) caused by the excessive charges may be decreased. The X-ray device has improved the quality or the reliability.

Figure 4C:
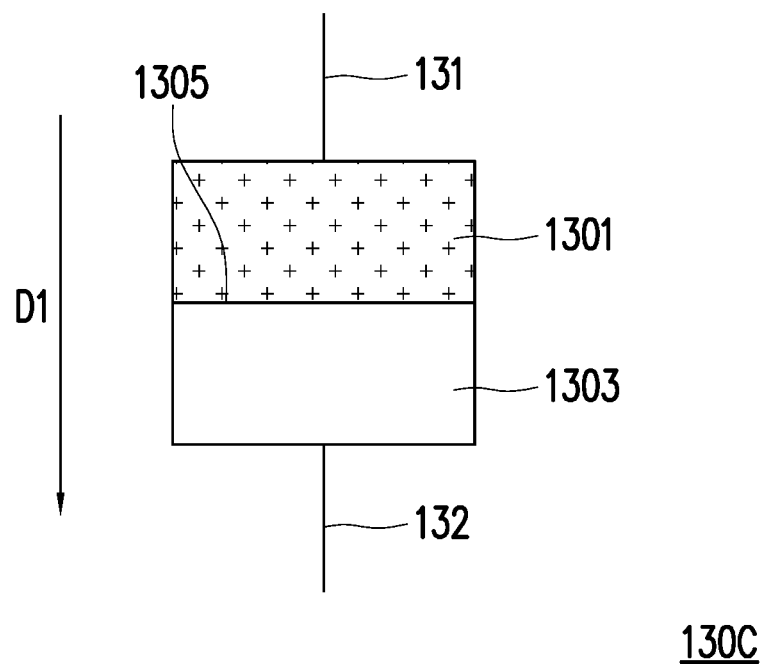
FIG. 4C is a schematic diagram of the branching element in yet another embodiment of the present disclosure.

FIG. 4C is a schematic diagram of the branching element in yet another embodiment of the present disclosure. In the illustrated embodiment, the branching element 130C may be a diode. The branching element 130C of the present embodiment is substantially similar to the branching element 130B in FIG. 4B, and thus the same and similar components in the two embodiments are omitted herein. The present embodiment is different from the branching element 130B in that the branching element 130C may be a PN diode. For example. the branching element 130C may include a first doped layer 1301 and a second doped layer 1303. The first doped layer 1301 may contact the second doped layer 1303. The first doped layer 1301 may include the p-type semiconductor. The second doped layer 1303 may include the n-type semiconductor. An interface 1305 of the first doped layer 1301 and the second doped layer 1303 may be a p-n junction.

In some embodiments, the first doped layer 1301 may be electrically coupled to the first terminal 131 of the branching element 130C, and the second doped layer 1303 may be electrically coupled to the second terminal 132 of the branching element 130C. For example. the first terminal 131 is the anode, and the second terminal 132 is the cathode. Under the above configuration, the first doped layer 1301 is electrically coupled to the first terminal 131 of the branching element 130C at the node N1 (shown in FIG. 2), and the second doped layer 1303 is electrically coupled to the second terminal 132 of the branching element 130C, which may be coupled to the bias signal with the bias voltage VB. When the voltage of the storage element 120 is larger than the bias voltage VB, electron-hole pairs may be formed in the branching element 130C, for example, the electron-hole pairs may be formed at the interface 1305. The first diverting current D1 is formed, thus a portion of the charges generated by the sensing element 140 may be diverted. In other word, the portion of the charges may flow through the first terminal 131, the first doped layer 1301, the intrinsic layer 1302, and the second doped layer 1303. Another portion of the charges generated by the sensing element 140 may be stored in the storage element 120. Therefore, the voltage of the storage element 120 may be decreased or maintained at a substantially similar level as the bias voltage VB. The high voltage level at the node N1 (as shown in FIG. 2 or FIG. 3) caused by the excessive charges may be decreased. The X-ray device has improved the quality or the reliability.

Figure 4D:
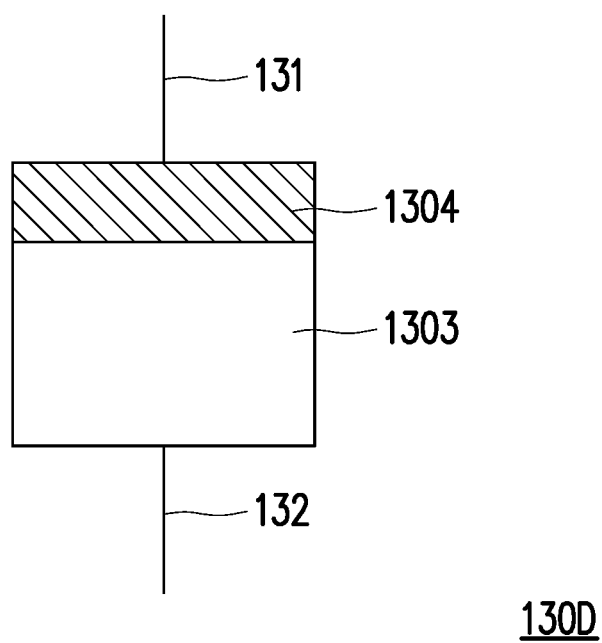
FIG. 4D is a schematic diagram of the branching element in yet another embodiment of the present disclosure.

FIG. 4D is a schematic diagram of the branching element in yet another embodiment of the present disclosure. In the illustrated embodiment, the branching element 130D may be a diode. The branching element 130D of the present embodiment is substantially similar to the branching element 130C in FIG. 4C, and thus the same or similar components in the two embodiments are omitted herein. The present embodiment is different from the branching element 130C in that the branching element 130D may be a Schottky diode. For example. the branching element 130D may include a metal layer 1304 and a second doped layer 1303. The metal layer 1304 may contact the second doped layer 1303. The metal layer 1304 may include molybdenum, platinum, chromium, or tungsten. In some other embodiments, the metal layer may also include silicides, such as palladium silicide or platinum silicide, but not limited thereto. The second doped layer 1303 may include the n-type semiconductor.

In some embodiments, the metal layer 1304 is electrically coupled to the first terminal 131 of the branching element 130D, and the second doped layer 1303 may be electrically coupled to the second terminal 132 of the branching element 130D. For example. the first terminal 131 is the anode, and the second terminal 132 is the cathode. Under the above configuration, the metal layer 1304 is electrically coupled to the first terminal 131 of the branching element 130D at the node N1 (shown in FIG. 2), and the second doped layer 1303 is electrically coupled to the second terminal 132 of the branching element 130D, which may be coupled to the bias signal with the bias voltage VB (shown in FIG. 2). As shown in FIG. 2 and FIG. 4D, when the voltage of the storage element 120 is larger than the bias voltage VB, electron-hole pairs are formed in the second doped layer 1303. The first diverting current D1 is formed, thus a portion of the charges generated by the sensing element 140 may be diverted. In other word, the portion of the charges may flow through the first terminal 131, the first doped layer 1301, the intrinsic layer 1302, and the second doped layer 1303. Another portion of the charges generated by the sensing element 140 may be stored in the storage element 120. Therefore, the voltage of the storage element 120 may be decreased or maintained at a substantially similar level as the bias voltage VB. Based on the above, the voltage may be balanced, or kept at a desired voltage. The high voltage level at the node N1 caused by the excessive charges may be decreased. The X-ray device has improved the quality or the reliability.

Figure 5:
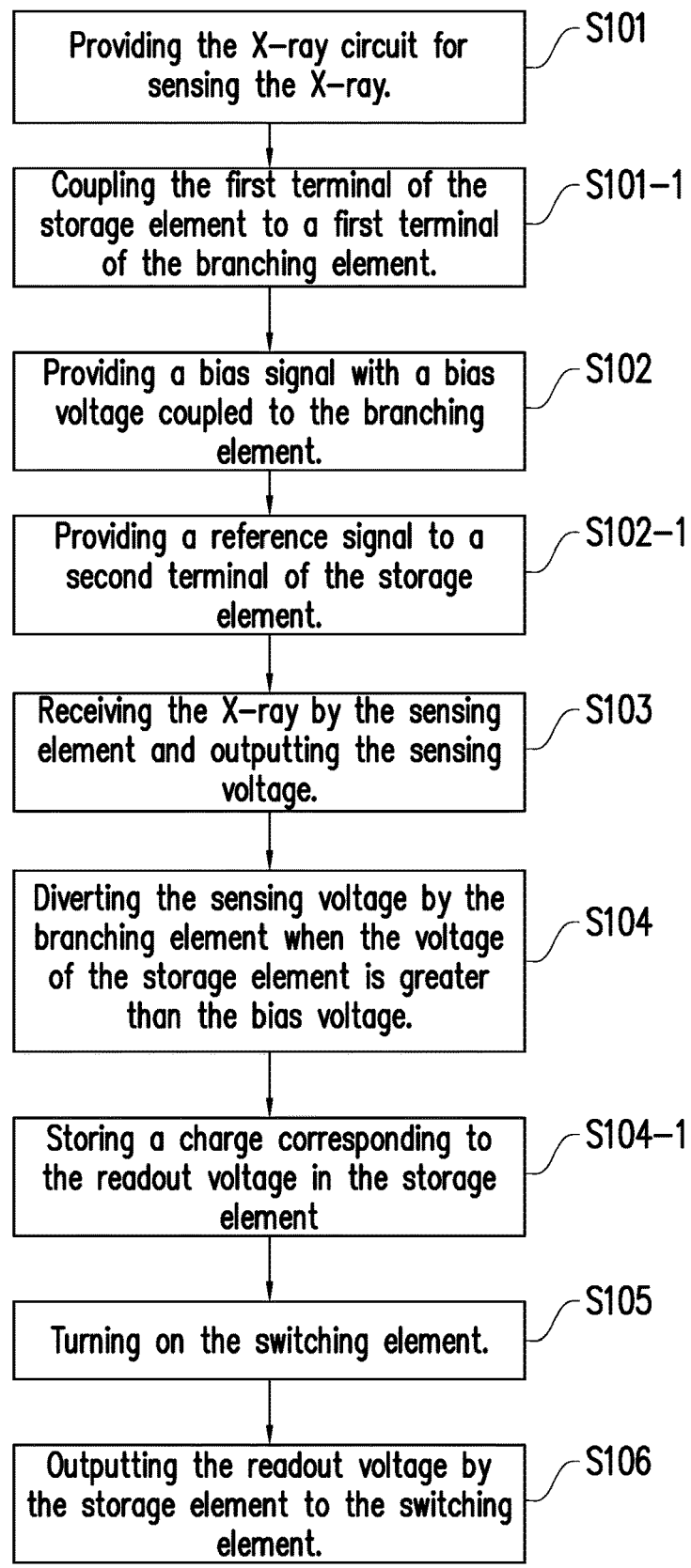
FIG. 5 is a flowchart of an embodiment of a method of driving the X-ray circuit for sensing the X-ray.

FIG. 5 is a flowchart of an embodiment of a method of driving the X-ray circuit for sensing the X-ray. A brief description of a method of driving the X-ray circuit 101 for sensing the X-ray is described hereinafter. In Step S101, the X-ray circuit 101 for sensing the X-ray as shown in FIG. 2 is provided.

In Step S101-1, the first terminal 121 of the storage element 120 is coupled to the first terminal 131 of the branching element 130.

In Step S102, the bias signal with the bias voltage VB coupled to the branching element 130 is provided. In some embodiments, the bias voltage VB coupled to the second terminal of the branching element 130 is provided.

In Step S102-1, the reference signal $V_{Ref}$ is provided to the second terminal 122 of the storage element 120.

In Step S103, the X-ray is received by the sensing element 140 and being outputted as the sensing voltage (e.g. the first voltage V1).

In Step S104, the sensing voltage is diverted by the branching element 130 when an absolute value of the voltage of the storage element 120 is greater than an absolute value of the bias voltage. In detail, the first diverting current D1 may be generated and flow through the first terminal 131 of the branching element 130 and the second terminal 132 of the branching element 130 to divert the sensing voltage. For example, the first diverting current D1 may flow from the first terminal 131 of the branching element 130 to the second terminal 132 of the branching element 130. In other word, a portion of the charges which generate the sensing voltage may be diverted to the branching element 130. Another portion of the charges may flow to the storage element 120 and may be stored in the storage element 120. A readout voltage corresponding to the another portion of the charges as mentioned above may be outputted by the storage element 120. In some embodiment, the readout voltage may be generated by the another portion of the charges as mentioned above, but not limited thereto.

In Step 104-1, a charge corresponding to the readout voltage is stored in the storage element 120.

In Step S105, the switching element 110 may be turned on after diverting the sensing voltage. In detail, the scan signal SN may be transmitted to the control terminal 111 of the switching element 110 which electrically coupled to the scan signal SN, and the switching element 110 is turned on. In some embodiments, the absolute value of the voltage of the storage element 120 is substaintially equal to the absolute value of the bias voltage before the Step S105. So that, the probability of damaged the switching element 110 by the higher voltage may be decreased when turning on the switching element 110.

In Step S106, the readout voltage outputted by the storage element 120 is outputted to the switching element 110. In other word, the readout voltage may cause a readout current flowing through the third terminal 113 of the switching element 110 and the second terminal 112 of the switching element 110. The readout current at the second terminal 112 may be the readout signal RO, and may be read by the circuit component. According to the above, higher voltage level caused by the excessive charges may be decreased. The method of driving the X-ray circuit 101 for sensing the X-ray may provide improving the quality or the reliability.

Based on the above, the x-ray device of the embodiment of the present disclosure includes the branching element coupled to the switching element, and the branching element is coupled between the storage element and the sensing element. When the voltage at first terminal of the branching element and the second voltage value at the second terminal of the branching element are different (such as the voltage of the storage element is different from the bias voltage), the diverting current may be formed across the branching element. The sensing voltage from the sensing element may flow from the first terminal of the branching element to the second terminal of the branching element thus diverting the sensing voltage, or decreasing the voltage of the storage element to be substantially the same as the bias voltage. Or in another embodiment, the voltage of the storage element may be increased to be substantially the same as the bias voltage. Therefore, the voltage of the storage element may be maintained at a substantially similar level as the bias voltage. According to the above, the higher voltage level caused by the excessive charges may be decreased. The circuit for sensing the X-ray has improved the quality or the reliability. The method of driving the X-ray circuit for sensing the X-ray provides improved the quality or the reliability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A circuit for sensing an X-ray, comprising:
   a switching element, comprising a transistor;
   a storage element, comprising a capacitor and electrically connected to the switching element, wherein the storage element has a first terminal electrically connected to the switching element;
   a sensing element, comprising a photoconductor or a photodiode, and electrically connected to the switching element; and
   a branching element, comprising a switch or a diode, or a combination thereof, and electrically connected to the storage element and the sensing element
   wherein the branching element has a first terminal electrically connected to the first terminal of the storage element and a second terminal electrically coupled to a bias signal with a bias voltage, and
   the branching element provides a diverting current flowing in a direction from the second terminal of the branching element to the first terminal of the branching element when a voltage of the first terminal of the storage element is less than the bias voltage.

2. The circuit as claimed in claim 1, wherein the switching element has a control terminal, a second terminal, and a third terminal, and the first terminal of the storage element is electrically connected to the third terminal of the switching element.

3. The circuit as claimed in claim 2, wherein the storage element has a second terminal electrically coupled to a reference signal.

4. The circuit as claimed in claim 3, wherein the reference signal is a ground signal.

5. The circuit as claimed in claim 3, wherein the control terminal of the switching element is electrically coupled to a scan signal.

6. The circuit as claimed in claim 3, wherein the second terminal of the switching element is electrically coupled to a readout signal.

7. The circuit as claimed in claim 1, wherein the branching element has a control terminal electrically coupled to the first terminal of the branching element.

8. The circuit as claimed in claim 1, wherein the branching element has a first doped layer electrically coupled to the first terminal of the branching element, a second doped layer electrically coupled to the second terminal of the branching element, and an intrinsic layer disposed between the first doped layer and the second doped layer.

9. The circuit as claimed in claim 1, wherein the branching element has a first doped layer electrically coupled to the first terminal of the branching element, a second doped layer electrically coupled to the second terminal of the branching element, and the first doped layer contacts the second doped layer.

10. The circuit as claimed in claim 1, wherein the branching element has a metal layer electrically coupled to the first terminal of the branching element, and a doped layer electrically coupled to the second terminal of the branching element, and the metal layer contacts the doped layer.

11. The circuit as claimed in claim 1, wherein the sensing element comprises amorphous selenium.

12. The circuit as claimed in claim 1, wherein a portion of charges generated by the sensing element is stored in the storage element.

13. The circuit as claimed in claim 1, wherein a first voltage generated by the sensing element is substantially the same as the bias voltage at the second terminal of the branching element.

14. The circuit as claimed in claim 1, wherein the sensing element is configured to provide a first voltage when the sensing element receives an X-ray radiation, and the branching element is configured to provide the diverting current for diverting the first voltage so as to maintain the first voltage of the sensing element at a substantially similar level as the bias voltage.

15. The circuit as claimed in claim 1, wherein the switching element is electrically connected to the storage element, the branching element and the sensing element at a first node and the branching element is configured to provide the diverting current for increasing a voltage level at the first node when a first voltage generated by the sensing element at the first node is less than the bias voltage.

* * * * *